US011501247B1

(12) United States Patent
Sahasrabudhe et al.

(10) Patent No.: US 11,501,247 B1
(45) Date of Patent: Nov. 15, 2022

(54) OPTIMIZING DELIVERY ROUTING USING MACHINE LEARNING SYSTEMS

(71) Applicant: GrubHub Holdings Inc., Chicago, IL (US)

(72) Inventors: Sagar Sahasrabudhe, Chicago, IL (US); Gregory Danko, Oak Park, IL (US); Carolyn Mooney, Philadelphia, PA (US)

(73) Assignee: GRUBHUB HOLDINGS INC., Chicago, IL (US)

( * ) Notice: Subject to any disclaimer, the term of this patent is extended or adjusted under 35 U.S.C. 154(b) by 615 days.

(21) Appl. No.: 16/539,786

(22) Filed: Aug. 13, 2019

(51) Int. Cl.
*G06Q 10/08* (2012.01)
*G06N 20/00* (2019.01)

(52) U.S. Cl.
CPC ....... *G06Q 10/08355* (2013.01); *G06N 20/00* (2019.01)

(58) Field of Classification Search
CPC .......................... G06Q 10/08355; G06N 20/00
USPC ......................................................... 705/338
See application file for complete search history.

(56) References Cited

U.S. PATENT DOCUMENTS

| | | | |
|---|---|---|---|
| 6,701,299 B2 | 3/2004 | Kraisser | |
| 6,985,871 B2 | 1/2006 | Simon | |
| 7,233,907 B2 | 6/2007 | Young | |
| 10,885,479 B1* | 1/2021 | Reiss | G06Q 50/01 |
| 2015/0161564 A1* | 6/2015 | Sweeney | G06Q 50/30 |
| | | | 705/338 |
| 2016/0063435 A1* | 3/2016 | Shah | G06Q 20/42 |
| | | | 705/44 |
| 2018/0255428 A1* | 9/2018 | Bagchi | H04L 67/18 |
| 2018/0365637 A1* | 12/2018 | Smith | G06Q 10/067 |
| 2019/0063935 A1* | 2/2019 | Badalamenti | G06T 11/60 |
| 2019/0180229 A1* | 6/2019 | Phillips | G06Q 10/0833 |
| 2020/0160264 A1* | 5/2020 | Silverman | G06Q 10/06315 |

FOREIGN PATENT DOCUMENTS

| | | | |
|---|---|---|---|
| WO | WO 2005089474 A2 | 9/2005 | |
| WO | WO-2016166708 A1 * | 10/2016 | G06Q 10/0631 |

OTHER PUBLICATIONS

Ripert, Mathieu; "How Instacart delivers on time (using quantile regression)"; Mar. 6, 2018. (Year: 2018).*

* cited by examiner

*Primary Examiner* — Resha Desai
*Assistant Examiner* — Dione N. Simpson
(74) *Attorney, Agent, or Firm* — Baker Botts L.L.P.

(57) ABSTRACT

Systems and methods for using machine learning to estimate courier arrival times are described herein. According to an embodiment, a server computer receives a request to deliver to a requester prepared items associated with a preparation entity. The server additionally receives courier data identifying available couriers within the geographic region of the preparation entity and current request data identifying current requests to deliver prepared items from a plurality of entities in the geographic region. The server uses a trained machine learning system to compute an estimated pickup time, using at least the courier data and courier request data as inputs. The server computer then routes a preparation request to the preparation entity along with the estimated pickup time.

21 Claims, 6 Drawing Sheets

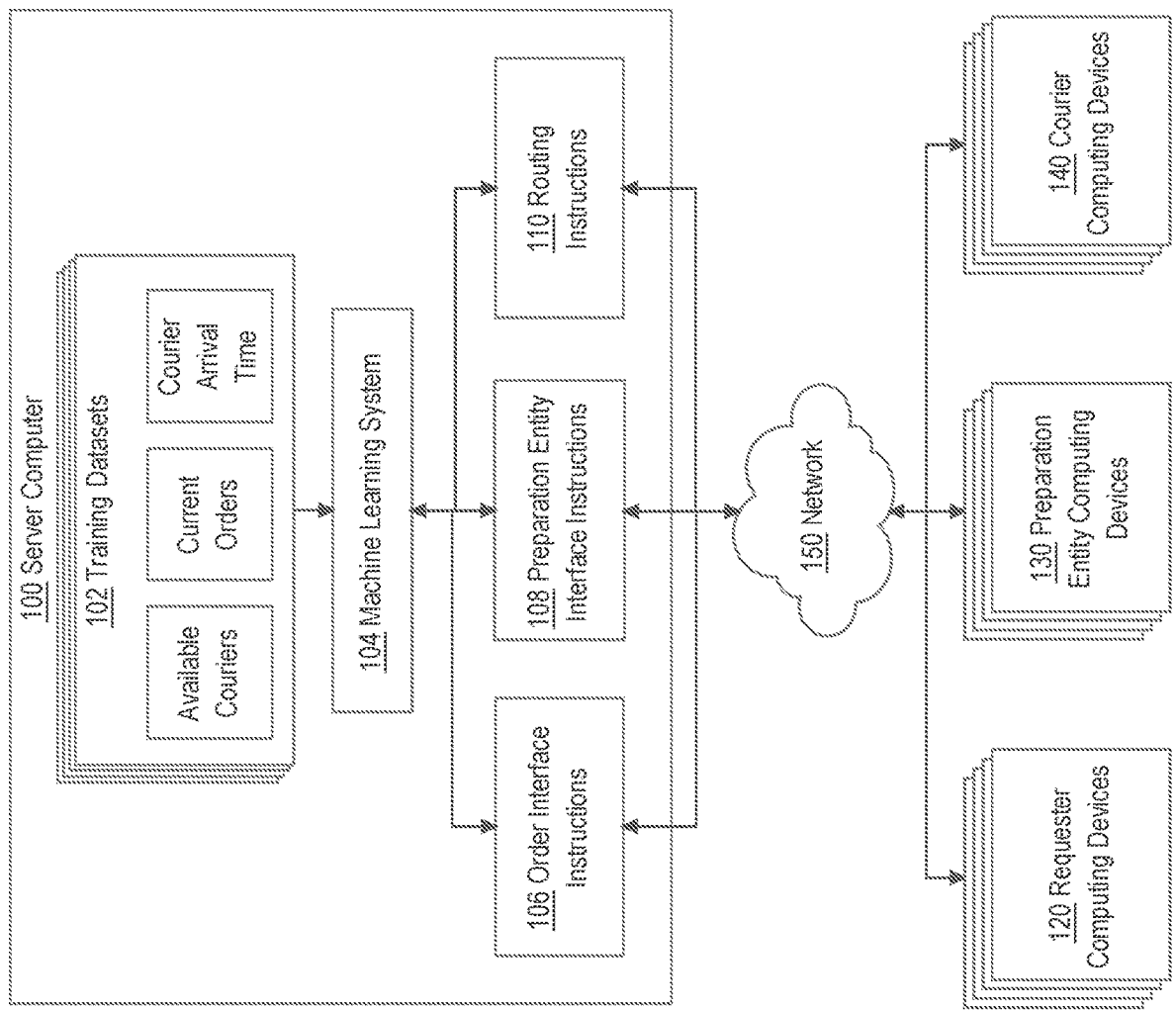

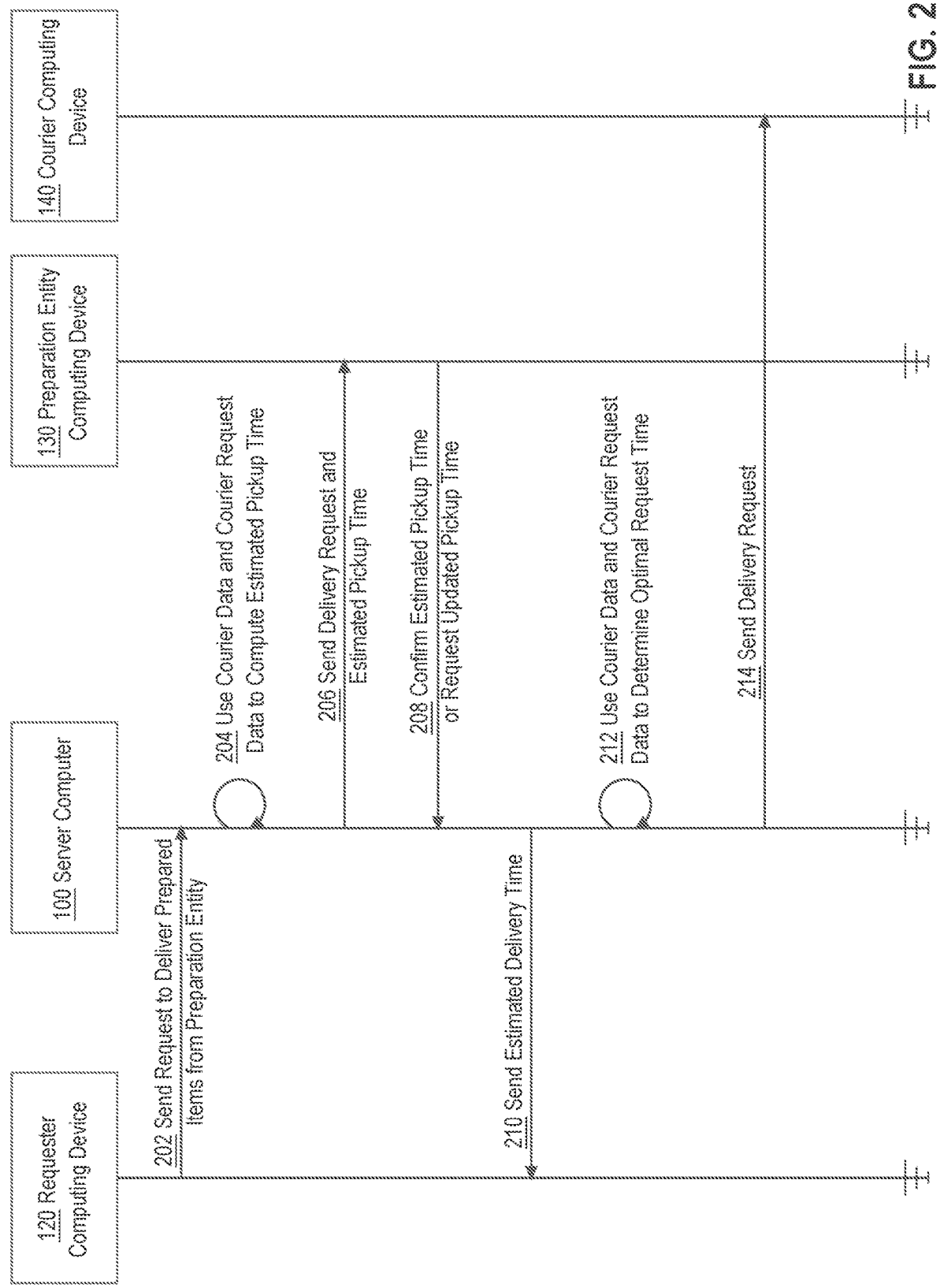

OPTIMIZING DELIVERY ROUTING USING MACHINE LEARNING SYSTEMS

FIELD OF THE DISCLOSURE

One technical field of the present disclosure is machine learning systems used to optimize routing of orders to restaurants and routing of delivery requests to couriers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Couriers, such as drivers and cyclists, are used to receive and delivery physical items in many different industrial fields including parcel delivery, parts delivery, supply of medical items and foodservice. Food delivery is time-sensitive as the freshness, temperature, and biological safety of prepared food degrade rapidly as time passes after preparation. Digital food delivery systems rely on a large amount of data and communication in order to route orders to preparation entities, such as restaurants, and to route drivers to the preparation entities to pick up the prepared items and deliver them to a requester or diner. With many digital delivery systems, a courier is not assigned to an order immediately after the order is placed. Assigning a courier immediately to an order that may not be ready for fifteen to twenty minutes creates a large amount of inefficiency as the couriers must wait for the preparation entity to finish preparing the requested items.

Determining an optimal time for a courier to arrive can be extremely important for all parties. If a courier arrives too late, then freshly prepared items can lose their freshness. Sushi can become warm, ramen can become cold, and bread can become stale. Additionally, the requester must wait even longer for the courier to deliver a meal. On the other hand, if a courier is too early, the system becomes less efficient as couriers are forced to sit around and wait for food to be prepared. Additionally, restaurants often prefer to not have a large number of couriers waiting in the restaurant for food to be prepared.

Determining the optimal time for a courier to arrive can also help set expectations to the requester early on in the process. If a system can determine when to have a courier arrive to the preparation entity such that items have just been finished being prepared, the courier can then update requesters with estimated delivery times, thereby avoiding situations where updates must come periodically from the courier as the courier waits for an item to be prepared.

Optimally, a system that knows when a restaurant would be able to have food prepared would be able to assign couriers at a perfect time. This would ensure that couriers arrive close to the completion of preparation, thereby ensuring higher quality food, faster delivery times, and better interactions between the couriers and the preparation entity. Unfortunately, this approach has two problems.

The first problem is the difficulty in determining when a restaurant would be able to have food prepared. The abilities of a restaurant to prepare food at a particular time is largely dependent on how busy the restaurant is, how well staffed the restaurant is, and whether any outside influences have affected when orders can be prepared, such as shortages of pre-prepared items. Modeling food preparation time would require a large amount of very specific data that is often unavailable to a routing server and would be often inaccurate.

A second problem is the difficulty in ensuring that a courier will be able to get to a restaurant by the completion of preparation. On busy days, available couriers may be backed up with orders such that the first courier would not be able to arrive for thirty minutes. Thus, even if the preparation time could be determined, it is possible that no driver could arrive by the preparation time, thereby causing drivers to be continuously late picking up food. Additionally, even if drivers are available, drivers may decline a request to deliver food from a restaurant due to any number of factors, such as distance, order size, or inadequate tip.

Thus, there is a need for an improved system which can ensure optimal routing of couriers to preparation entities such that neither the courier nor the prepared items must wait for the other.

SUMMARY

The appended claims may serve as a summary for the disclosure.

BRIEF DESCRIPTION OF THE DRAWINGS

In the drawings:

FIG. 1B is a block diagram of a system on which embodiments may be performed.

FIG. 2 is a message diagram depicting an example method of routing couriers to deliver prepared items.

DETAILED DESCRIPTION

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure.

General Overview

Systems and methods for using machine learning to improve the handoff of prepared items from a preparation entity to a courier are described herein. In an embodiment, a server computer trains a machine learning system to compute an amount of time from when an order is placed to when a courier is able to arrive at a preparation entity using, as inputs, at least a number of available couriers and a number of open orders. When an order is received, the server computer may identify a current number of available couriers and a current number of open orders and use the identified values to compute an estimated pickup time when a courier could arrive at the preparation entity. The server computer then routes the order with the estimated pickup time to the preparation entity so that the preparation entity can prepare items to be ready at the estimated pickup time. If the preparation entity needs more time to prepare the food for any reason, the preparation entity can respond to the order with a different pickup time based on when the preparation entity is able to prepare the items. The server can then send requests to couriers at an optimal time to ensure that the courier arrives at the preparation time at the estimated or updated pickup time.

In an embodiment, a method comprises receiving, from a requesting computing device, a request to deliver one or more prepared items associated with a preparation entity; receiving courier data identifying a plurality of available couriers within a particular geographic region in which the preparation entity is located, the couriers being capable of obtaining the prepared items from the preparation entity and transporting the prepared items to one or more recipients; receiving current request data identifying current requests to deliver prepared items from a plurality of entities in the particular geographic region in which the preparation entity is located; using a particular trained machine learning system, computing an estimated pickup time for the one or more prepared items using, at least, the courier data and current request data as inputs into the particular machine learning system; routing, to a computing device of the preparation entity, a request to prepare the one or more prepared items and the data identifying the estimated pickup time.

System Overview

Figure 1A:
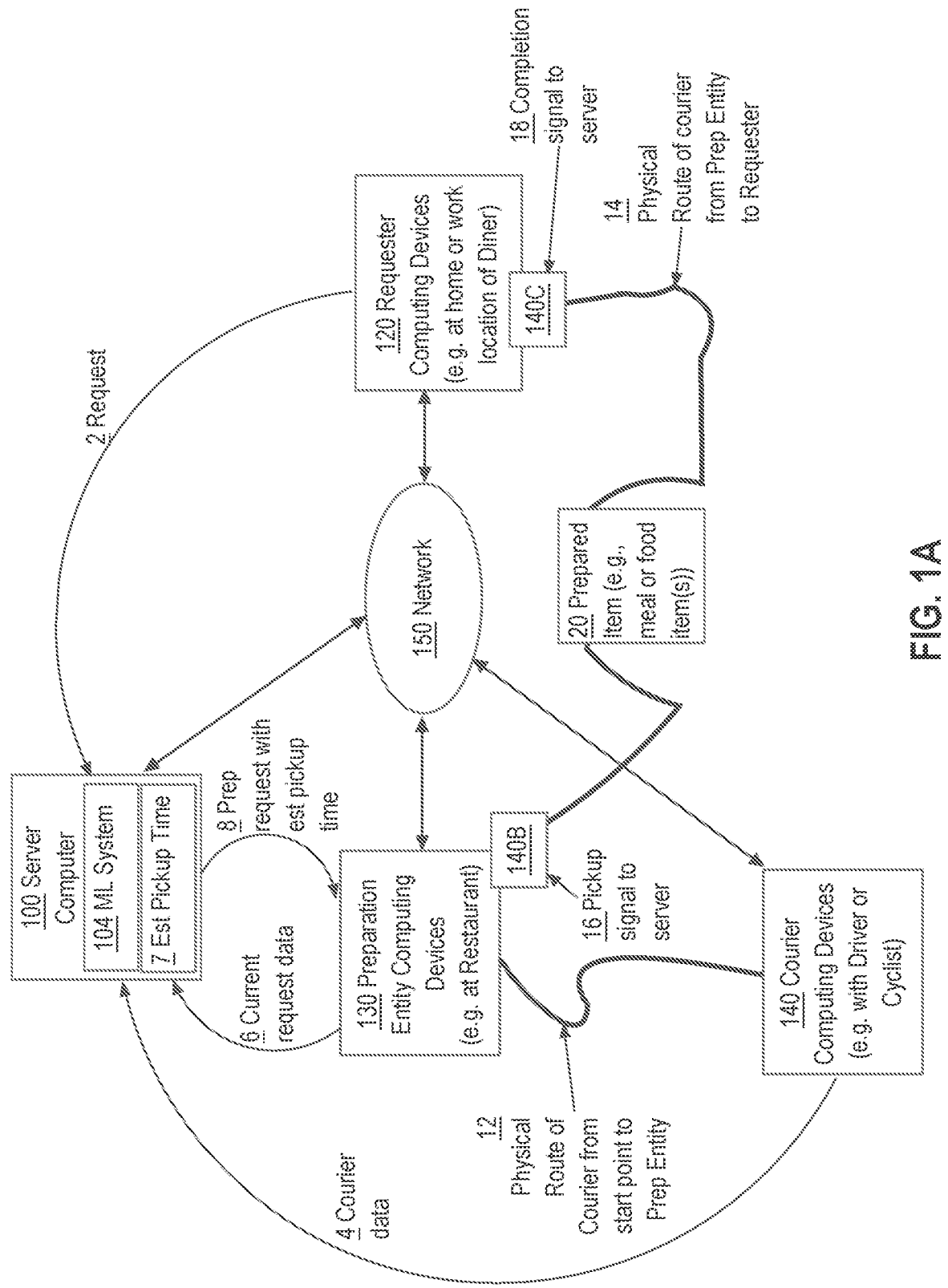
FIG. 1A is a block diagram of an example delivery routing system through which various embodiments may be practiced.

FIG. 1A is a block diagram of an example delivery routing system through which various embodiments may be practiced. FIGS. 1A and 1B are shown in simplified, schematic format for purposes of illustrating a clear example and other embodiments may include other elements.

Server computer 100, requester computing devices 120, preparation entity computing devices 130, and courier computing devices 140 are communicatively coupled over network 150. The server computer 100, requester computing devices 120, preparation entity computing devices 130, courier computing devices 140, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Embodiments relate to the routing of delivery of prepared items from a preparation entity to a requester location, such as delivery of food to a home or workplace of a diner. The server computer 100 receives requests 2 from the requester computing devices 120, courier data 4 from the courier computing devices 140, and current request data 6 from the preparation entity computing devices 130. While only one request and one delivery are depicted in FIG. 1A, the embodiments described herein may be utilized with a plurality of requests being received by the sever computer 100 over a period of time from a plurality of diners which are delivered by a plurality of diners. The courier data 4 and the current request data may thus correspond to each request. For example, when the server computer 100 receives request 2 from the requester computing devices 120, the server computer may request and/or aggregate courier data and courier request data for a time corresponding to the request.

The server computer 100 uses a stored machine learning system 104 to compute an estimated pickup time 7 and sends a preparation request with estimated pickup time 8 to the preparation entity computing devices. As used herein, the pickup time may refer to a particular time when a courier is expected to arrive and/or an amount of time from the original order until the courier is expected to arrive. Thus, the estimated pickup time may be fifteen minutes from the time of the order, but the data sent to a preparation entity computing device may identify the pickup time as a discreet time of day, such as 10:15 am. The server computer may additionally determine an optimal time to send the pickup request, such as a five minutes prior to the estimated pickup time.

The server computer reads a current time value of a system clock and determines that the current time value is equal to the time to send the request to a courier. The server computer then transmits the pickup request to the courier computing device 140 is sent a pickup request and the courier proceeds to the preparation entity over physical route 12. When the courier reaches the preparation entity, the courier computing device 140b sends a first completion signal 16 to server computer 100 indicating that the courier has arrived for pickup. The courier then proceeds to deliver the prepared item 20 across physical route 14 to the requester. When the courier arrives, the courier computing device 140c sends a second completion signal to server computer 100 indicating that the prepared item 20 has been delivered.

FIG. 1B is a block diagram of a system on which embodiments may be performed. Server computer 100 is communicatively coupled to requester computing device 120, preparation entity computing devices 130, and courier computing devices 140 over network 150. Server computer 100 may be implemented using a server-class computer or other computers having one or more processor cores, co-processors, or other computers. Server computer 110 may be a physical server computer and/or a virtual server instance stored in a data center, such as through cloud computing.

Server computer 100 comprises training datasets 102, machine learning system 104, order interface instructions 106, preparation entity interface instructions 108, and routing instructions 110.

Training datasets 102 comprise training data for use in training one or more machine learning systems 104. The training datasets 102 may comprise training inputs, training outputs, and/or context identifiers. The training inputs may comprise, for each dataset, at least courier data and courier request data. Courier data, as used herein, refers to data regarding available couriers, such as a number of couriers that are available for a delivery when a delivery request is received. Courier request data, as used herein, refers to data regarding active courier requests, such as a number of open orders when the delivery request is received. In an embodiment, the courier data and courier request data may be stored as a combined value, such as open request per courier or courier per open requests when the delivery request is received. The training outputs may comprise data identifying, for each order, a time at which a courier arrived at the preparation entity.

Data for training datasets 102 may be gathered over the course of a period of time, such as a week. For example, server computer 100 may continuously receive and store data identifying open orders and available couriers with corresponding timestamps. Open order data may be tracked as any orders that the server computer 100 has received for which the server computer has not received an indication from a courier computing device that the order has been picked up and/or delivered. The available courier data may be tracked as a number of courier devices which have sent a message to server computer 100 indicating availability for delivery which have not been assigned an order to deliver or has finished a delivery and has not been assigned a new delivery. The server computer 100 may also store data identifying timestamps corresponding to when requests are received by server computer 100, timestamps corresponding to when a courier device notified the server computer 100 that it arrived at a preparation entity, and/or timestamps corresponding to when a courier device notified the server computer 100 that it arrived at the requester.

Machine learning system 104 comprises one or more digitally programmed models which have been trained using training datasets 102 to compute an estimated time to pick up from, at least, current courier data and current courier request data. The machine learning system 104 may be any of a regression model, such as linear or quantile regression, gradient boosted machines, random forest models, neural networks, or other types of machine learning models which can be trained with numerical inputs to produce a numerical output.

Order interface instructions 106 comprise computer readable instructions which, when executed, cause the server computer 100 to provide a graphical user interface to one or more requester computing devices 120 for ordering a prepared item. For example, the server computer 100 may provide a food delivery interface with options for a diner to select items and order items from various restaurants. The server computer 100 may provide information regarding a diner's order and/or delivery time to the requester computing devices 120 through the provided graphical user interface and/or through other means of electronic communication, such as short message service (SMS) messaging, email, and the like.

Preparation entity interface instructions 108 comprise computer readable instructions which, when executed, cause the server computer 100 to provide a graphical user interface to one or more preparation entity computing devices 130. The graphical user interface provided to the preparation entities may identify requested orders from requester computing devices and estimated pickup times. The graphical user interface may additionally provide options for requesting a change in pickup times. Additionally or alternatively, the server computer 100 may communicate with the preparation entity computing devices 130 through other means, such as through an application programming interface (API) of an ordering system of the preparation entity and/or through other means of messaging, such as SMS messaging, email, and the like.

Routing instructions 110 comprise computer readable instructions which, when executed, cause the server computer 100 to route prepared item requests to one or more courier computing devices 140. The server computer 100 may additionally receive information from the courier computing devices 140 identifying availability of the courier computing devices 140 to accept orders and/or identifying a location of the courier computing devices 140. The server computer may send requests to deliver prepared items to a requester through a graphical user interface provided to the courier computing devices from server 100, such as through an application executing on a mobile device.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 100.

The computing devices, such as requester computing devices 120, preparation entity computing devices 130, and/or courier computing devices 140 may comprise computers that include hardware capable of communicatively coupling the computers to one or more server computers, such as server computer 100 over one or more service providers. For example, requester computing devices 120, preparation entity computing devices 130, and/or courier computing devices 140 may include a network card that communicates with server computer 100 through home or office wireless routers (not illustrated in FIG. 1) coupled to an internet service provider. The requester computing devices 120, preparation entity computing devices 130, and/or courier computing devices 140 may be any of smart phones, personal computers, tablet computing devices, PDAs, laptops, or any other computing devices capable of transmitting and receiving information and performing the functions described herein.

Network 150 may be implemented by any medium or mechanism that provides for the exchange of data between the various elements of FIG. 1. Examples of network 150 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 150 is shown as a single element but in practice, network 100 may comprise one or more local area networks, wide area networks, and/or internetworks. The various elements of FIG. 1 may also have direct (wired or wireless) communications links, depending upon a particular implementation.

The elements in FIG. 1 are intended to represent one workable embodiment but are not intended to constrain or limit the number of elements that could be used in other embodiments. For instance, server computer 100 may comprise a plurality of computing systems, such as a first computing system which performs the tracking of courier computing devices and a second computing system which performs the computations through the machine learning system.

Pickup Estimation Workflow

FIG. 2 is a message diagram depicting an example method of routing couriers to deliver prepared items.

At step 202, a requester computing device 120 sends a request to server computer 100 to deliver prepared items from a preparation entity. For example, a diner may request delivery of food from a particular restaurant through a graphical user interface provided by the server computer 100 to requester computing device 120.

At step 204, the server computer 100 uses courier data and courier request data to compute an estimated pickup time.

For example, the server computer 100 may identify a current number of available drivers and a current number of requests. The current number of requests may refer to orders which have not been assigned to a driver and/or orders that have not been delivered. The server computer 100 may then use a machine learning system to compute an estimated time that a courier could arrive at the preparation entity that is preparing the requested item using, as inputs, the current number of available drivers and current number of requests. In other embodiments, the machine learning system is trained on additional features, such as preparation entity features, driver features, order features, etc. Example machine learning systems and features are described further herein.

In an embodiment, the server computer 100 stores a minimum pickup time threshold, such as five minutes. If the estimated pickup time is less than the minimum pickup time threshold, the server computer may send a minimum pickup time to the preparation entity computing device. For example, if an order is received at 10:00 am and the estimated pickup time is three minutes, the server computer may select the minimum pickup time threshold of five minutes and send, to the preparation entity computer, the estimated pickup time of 10:05 am.

At step 206, the server computer 100 sends a delivery request and the estimated pickup time to a preparation entity computing device 130. For example, the server computer 100 may send a message to a restaurant's computing device identifying one or more items for the order and a time at which a courier could arrive to pick up the items, thereby allowing the restaurant to better plan how and when to prepare the items so that they are fresh when the courier arrives.

At step 208, the preparation entity computing device 130 confirms the estimated pickup time or requests an updated pickup time. For example, the preparation entity computing device 130 may send a confirmation to the server computer 100 indicating that the preparation entity is able to prepare the requested items by the pickup time. Alternatively, the preparation entity may respond with an updated pickup time that is later than the received pickup time, such as when a kitchen is backed up and the preparation entity cannot prepare the requested items by the requested pickup time.

At step 210, the server computer 100 sends an estimated delivery time to the requester computing device 120. For example, the server computer may determine an amount of time it would take the courier to travel from the preparation entity to a requested delivery location. The server computer 100 may use the estimated pickup time with the estimated delivery time to compute an approximate time at which the courier will be able to deliver the prepared items. By computing the estimated pickup time prior to assigning a courier, the server computer 100 is able to provide the requester computing device 120 with estimated delivery times early on in the delivery process and reduce the likelihood of having to send an updated delivery time to the requester computing device 120 when a preparation entity is backed up.

At step 212, the server computer 100 uses courier data and courier request data to determine an optimal request time. For example, the server computer may use the machine learning system to additionally compute a confidence interval for the estimated pickup time. The server computer may use the confidence interval to determine an optimal pickup time. For instance, if the confidence interval spread is larger than a threshold value, the server computer 100 may begin sending requests to couriers a particular amount of time earlier than would be usual. Thus, if the server computer usually sends requests to couriers within a five-mile radius of a destination ten minutes prior to a pickup time, the server computer may send the request to a courier fifteen minutes prior to the pickup time if the confidence interval spread is larger than the threshold value.

At step 214, the server computer 100 sends a delivery request to a courier computing device 140. For example, the server computer 100 may send details of the order request to a courier computing device 140 with a request to pick up the prepared item at the preparation entity and deliver it to a dining location. If the courier computing device rejects the request, the server computer 100 may identify a different courier computing device that is available to fulfill the request and send the request to the different courier computing device. A courier may then travel to the preparation entity, pick up the prepared items, and deliver them to the requester. In an embodiment, the courier computing device sends a notification to the server computer 100 when the courier arrives at the preparation entity, when the courier receives the prepared items, when the courier leaves the preparation entity, when the courier arrives at the requester location, and/or when the courier delivers the prepared item to the requester.

Machine Learning Model

In an embodiment, the server computer trains a machine learning system using previous courier data, courier request data, and historical preparation entity arrival times. For example, the system may train a quantile regression system using two variables as inputs, a number of available drivers and a number of current orders, and a pickup time as the outputs. The pickup time may be an amount of time between the ordering of the item and the arrival of a driver at the preparation entity. Thus, if a meal is ordered at 10:00 am and a driver arrives at the restaurant at 10:40 am, the pickup time may be stored as forty minutes. While embodiments are described using two variables, other embodiments may train the machine learning model with one variable of orders per courier or couriers per order.

In an embodiment, the server computer computes a 50% likelihood value using the trained quantile regression model to determine the estimated pickup time. Example quantile regression models are available through the "statsmodels" package in the standard Python libraries. The server computer may compute the mean value of the quantile regression model using the input courier data and courier request data to generate the estimated pickup time.

Additionally, the server computer may compute a confidence interval for the estimated pickup time by computing other likelihood values using the trained quantile regression model. For example, for an 80% confidence interval, the server computer may compute a 10% likelihood value and a 90% likelihood value. The server computer may evaluate the confidence interval to determine when to send a request to a courier. For example, if the confidence interval is plus or minus five minutes, the server computer may send out the request five minutes early.

In an embodiment, the server computer retrains the model periodically. For example, the server computer may continuously collect data for each order, such as courier data courier request data, and a pickup time for the order. The server computer may retrain the model each week with a prior week's training data.

In an embodiment, the server computer periodically reruns the model for open orders prior to assignment of a driver. For example, the server computer may compute outputs for the machine learning model every 2 minutes for a particular order based on current conditions. The server computer may determine whether a new output of the machine learning model is more than a threshold value greater than a previous output. For example, the server computer may determine if the estimated pickup time is more than ten minutes after the previously estimated pickup time. If the server computer determines that the new output is more than the threshold value greater than the previous output, the server computer may send an update to the preparation entity with the new pickup time.

Additional Features

In an embodiment, the server computer trains the machine learning system with additional features. The additional features may be used as individual variables and/or transformed into features usable by a machine learning system using one or more transformation algorithms, such as cubic splines. Additionally or alternatively, to incorporate additional features, a tree-based model may be used, such as gradient boosted machines or a random forest model, instead of or in addition to the quantile regression model. Other alternatives may utilize deep learning systems, such as neural networks.

Figure 3:
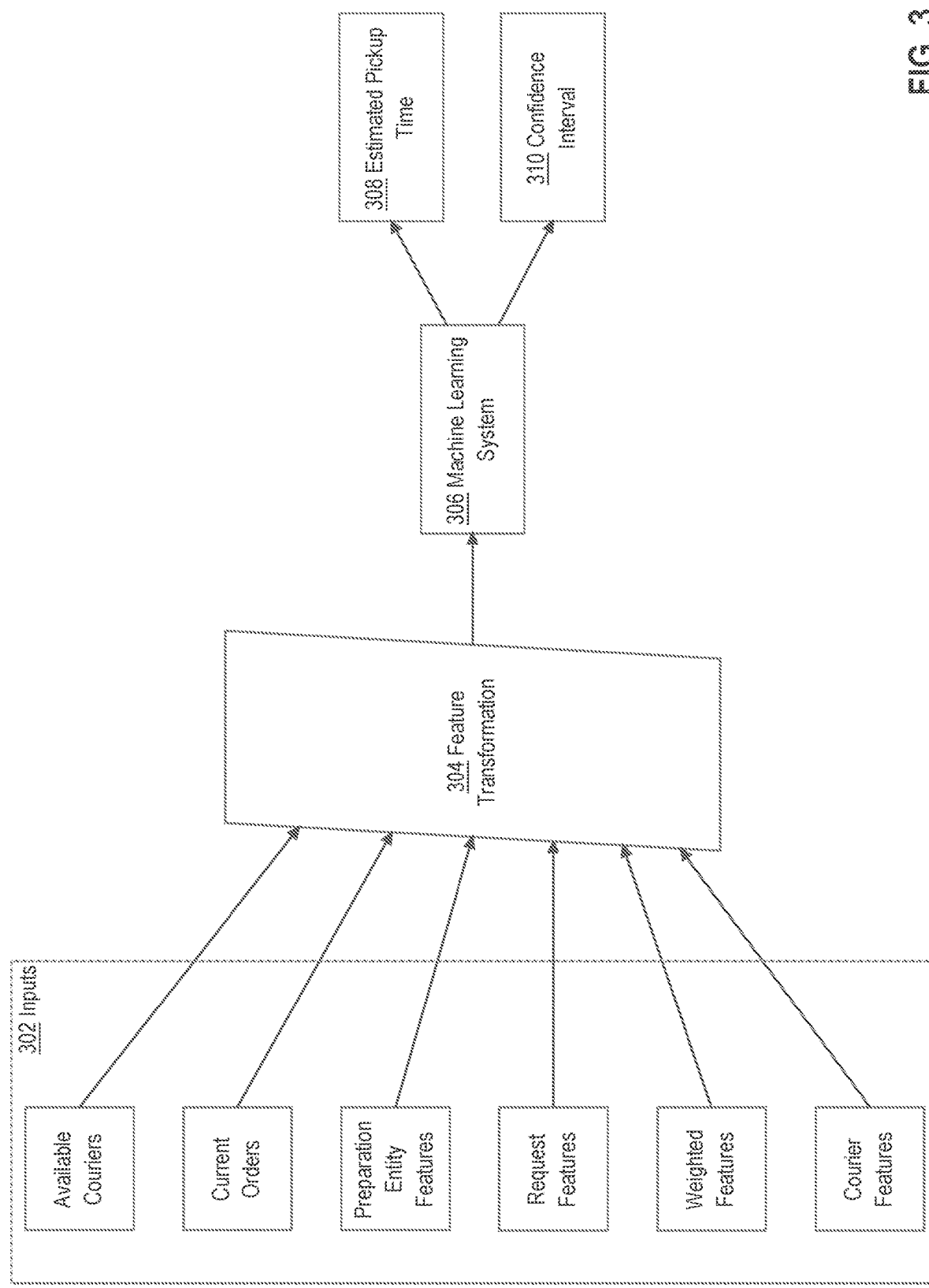
FIG. 3 depicts an example machine learning model that incorporates additional features.

FIG. 3 depicts an example machine learning model that incorporates additional features. FIG. 3 is intended to provide a clear example, but machine learning models may be trained using any combination of the features described in FIG. 3 as long as the training data includes available couriers and current orders in some form, such as individual variables or one combined variable.

Inputs 302 comprise inputs into the machine learning system. While each of the inputs are described as undergoing a feature transformation 304, the feature transformation may only apply to a subset of the inputs or, if a tree-based model is used, none of the inputs. Feature transformation 304 may comprise an algorithm for transforming features to be used by the machine learning system. Feature transformation 304 may additionally be a machine learning system that is trained to learn transformations of variables, such as through cubic splines or through a first layer of a neural network. Machine learning system 306 may be any of the machine learning systems described herein which is programmed to compute an estimated pickup time 308 and a confidence interval 310.

Available couriers refer to a number of couriers available to accept an order, such as couriers who have indicated availability for performing a delivery but have not yet been assigned a delivery. Available couriers may include a plurality of values, such as a number of unassigned drivers, a number of drivers with only a single delivery, and/or a number of drivers available which have a plurality of delivery assigned. Current orders refer to a current number of orders that have been place but for which delivery has not occurred. Current orders may include one or more of unassigned orders, assigned orders that have yet to be picked up, or assigned orders which have been picked up but not yet delivered. By including multiple values for available couriers and current orders, the server computer 100 strengthens the machine learning system by identifying other factors that could contribute to available pickup times.

In addition to the available couriers and current orders, the inputs 302 include one or more preparation entity features. The preparation entity features may include a number or percentage of rejections that the server computer has received from couriers for orders at the preparation entity. The preparation entity features may additionally include one or more values corresponding to a historical distribution of pickup times for the particular restaurant such as a normalized mean pickup time and/or median pickup time. For example, if a particular restaurant is difficult to reach or tends to take longer to prepare food than average, the particular restaurant may have a normalized pickup time average that is higher than other restaurants. By feeding this data into the machine learning system, the server computer 100 may account for differences in pickup times based on an individual restaurant's features.

The inputs 302 may additionally or alternatively include request features. The request features refer to features associated with the request sent by the requesting computing device. Request features may include a total price of the order, a tip amount on the order, and/or a distance from the requester location to the preparation entity.

The inputs 302 may additionally or alternatively include weighted features. For example, the server computer 100 may calculate weight values for the available couriers and/or available orders by distance to the preparation entity. The weight may be simplified, such as through inverse distance weighting, or learned, such as through cubic splines. The server computer 100 may augment the available courier inputs and/or courier order inputs using the simplified and/or learned weights.

The inputs 302 may additionally or alternatively include courier features. Courier features refer to features associated with couriers assigned to the individual orders. Courier features may include number or percentage of rejections for the courier and/or a learned feature relating rejection likelihood to order size and/or tip size.

In an embodiment, the inputs 302 may include outputs of a machine learning system which determines, from available order data and previous courier assignments, when the assignment system is likely to assign drivers. The machine learning system may be trained similarly to the pickup time machine learning system, utilizing current orders and available drivers as inputs, but replacing the pickup time output with an assignment time output indicating how long it took for an assignment system to assign the delivery to a driver. Additional machine learning outputs that may be used as inputs 302 may include outputs from a machine learning system configured to compute how long it would take a driver to get to the restaurant after being assigned the order.

Context-Based Model Selection

In an embodiment, the server computer 100 stores a plurality of machine learning systems, each of which trained for a different context. For example, received data that is used as a dataset, such as a particular order pickup time, number of couriers at the time of the particular order, and number of orders at the time of the particular order, may be categorized as belonging to a particular context and stored in a dataset comprising other data values that have been categorized as belonging to the particular context. The server computer 100 may then train a different machine learning system for each context. When an order is received, the server computer 100 may identify the context of the order and compute the estimated pickup time for the order using the machine learning system that was trained with a dataset of the same context as the order.

Contexts for training and utilizing machine learning models may include day contexts, time contexts, region contexts, and/or other contexts that can distinguish between different sets of data which affect the accuracy and/or effectiveness of the model.

Day contexts may comprise a day of the week and/or a day type. For example, the server computer 100 may train a first machine learning system using the context of "weekdays" corresponding to orders that occurred between Monday and Friday of a week and a second machine learning system using the context of "weekends" corresponding to orders that occurred on a Saturday or Sunday. Additionally or alternatively, the server computer may store models corresponding to "holidays" which comprise a set of predetermined holiday dates. As another example, the server computer 100 may train a different model for each day of the week.

Time contexts may comprise a period of time during the day. For example, the server computer 100 may train machine learning systems for a "breakfast" period ranging from 8:00 am to 11:00 am, a "lunch" period ranging from 11:00 am to 3:00 pm, a "dinner" period ranging from 3:00 μm to 9:00 pm, a "fourth meal" period ranging from 9:00 pm to 2:00 am, and an "after hours" period ranging from 2:00 am to 8:00 am. The periods may be predetermined time periods, such as the time blocks described above and/or learned time periods based on spikes in business or other types of groupings. For example, the server computer 100 may use a cubic splines algorithm or other grouping algorithms to determine beginning points and end points of different time periods based on similarities in activity, such as orders and/or drivers, during those periods of time. The server computer 100 may then train a different machine learning system for each of the different contexts.

Region contexts may comprise a geographic region. The region may refer to a geographic region of the requester and/or a geographic region of the preparation entity. The regions may be predetermined, such as based on neighborhoods, zip codes, city delineations, or other geographic boundaries. Additionally or alternatively, the server computer may determine geographic regions based on activity. For example, the server computer 100 may use cubic splines or one or more other grouping algorithms to determine the geographical boundaries.

Figure 4:
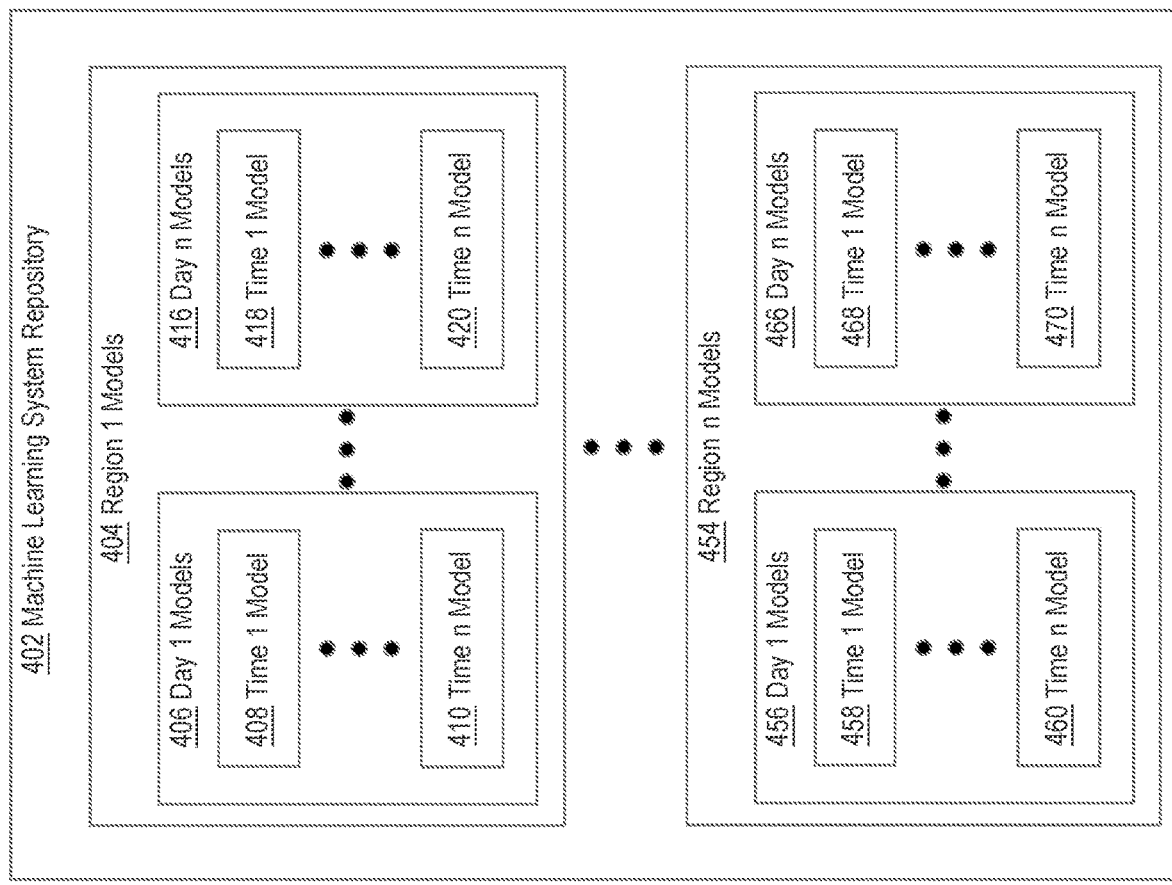
FIG. 4 depicts an example set of trained machine learning systems corresponding to different contexts.

The system may store models for each context of a single context type and/or for each combination of contexts of a plurality of context types as described herein with respect to FIG. 4. FIG. 4 depicts an example set of trained machine learning systems corresponding to different contexts. Machine learning system repository 402 stores models for a plurality of regions, ranging from region 1 models 404 to region n models 454. For each region, the server computer stores a plurality of day models. Thus, for region 1 models 404, the server computer stores day 1 models 406 to day n models 416 and for region n, the server computer stores day 1 models 456 to day n models 466. Then, for each combination of regions and days, the server computer stores time 1 models 408, 418, 458, and 468 to time n models 410, 420, 460, and 470. Thus, given two regions, two day contexts, and two time contexts, the machine learning system repository 408 may store eight trained machine learning models.

As a practical example, a server computer may store models for two cities, San Francisco and Los Angeles, two day contexts, weekday or weekend, and three time contexts, breakfast, lunch, and dinner. The server computer may train each of the twelve stored models using data corresponding to the model's context. Thus, for the weekday lunch Los Angeles model, the server computer may only train the model using data from orders that occurred in Los Angeles, on a weekday, and during the lunch period. When the server computer receives a new order, the server computer may initially determine the context of the order. Thus, if a new order is received on a Saturday night in San Francisco, the server computer may determine the context as weeknight dinner in San Francisco and select the trained machine learning model that corresponds to weeknight dinner in San Francisco. The server computer may then compute the estimated pickup time using the selected model.

Benefits of Certain Embodiments

The systems and methods described herein improve the ability of a computing device to route orders and drivers. By computing an estimated pickup time before a driver is assigned to an order, the system is able to provide advanced notice to a restaurant of when and how to prepare food items. This allows for improved communication, as the restaurant can respond with an updated pickup time, thereby increasing efficiency as the system can wait to assign a courier to an order until instead of forcing an assignment when food has yet to be prepared.

Additionally, the systems and methods described herein provide benefits to a computing system. By storing models for a plurality of different contexts, the system accounts for geographic and temporal differences in preparation times and response times. The system is additionally able to train models in parallel, thereby increasing the efficiency of the model training while reducing the time it takes to train full machine learning systems. Additionally, as the system is able to retrain the models periodically, the system can continue to improve each model, thereby improving pickup time estimates.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
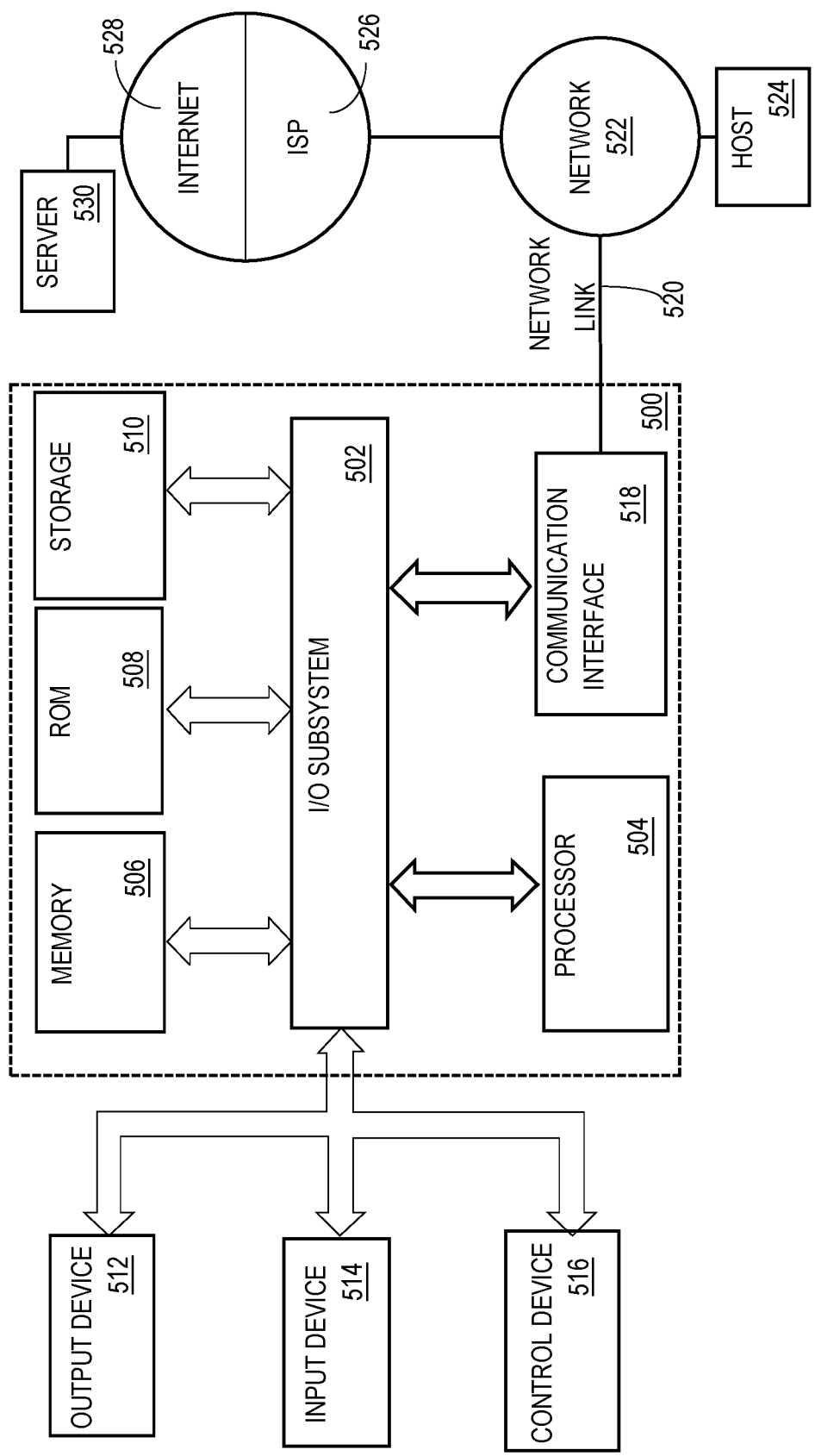
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer system comprising:
one or more processors;
a memory storing instructions which, when executed by the one or more processors, causes performance of:
receiving, from a requesting computing device, a request to deliver one or more prepared items associated with a preparation entity;
receiving courier data identifying a plurality of available couriers within a particular geographic region in which the preparation entity is located, the couriers being capable of obtaining the prepared items from the preparation entity and transporting the prepared items to one or more recipients;
receiving current request data identifying current requests to deliver prepared items from preparation entity computing devices of a plurality of entities in the particular geographic region in which the preparation entity is located;
using a particular trained machine learning system, comprising a quantile regression system having been trained using as inputs at least a number of available couriers at a time when an order is placed and a number of current orders at the time when the order is placed and using as outputs an amount of time from when the order was placed to when a courier arrived at a preparation entity corresponding to the order, computing an estimated pickup time for the one or more prepared items using, at least, the courier data and current request data as inputs into the particular machine learning system;
routing, to a computing device of the preparation entity, a request to prepare the one or more prepared items and the data identifying the estimated pickup time;
based on the courier data, current request data, and a pickup time of the request, retraining the particular trained machine learning system.

2. The computer system of claim 1, wherein the instructions, when executed by the one or more processors, further causes performance of:
receiving, from the computing device corresponding to the preparation entity, an updated pickup time;
storing the updated pickup time with the request;
selecting a time to send a request to a particular courier of the available couriers based, at least in part, on the updated pickup time.

3. The computer system of claim 2, wherein the instructions, when executed by the one or more processors, further causes performance of reading a current time value of a system clock, determining that the current time value is equal to the time to send the request to a particular courier, transmitting the request over a computer network to the particular courier to obtain the prepared items from the preparation entity, receiving a first completion signal from the preparation entity signaling that the particular courier obtained the prepared items, and receiving a completion signal over the computer network from the particular courier signaling that the particular courier completed transporting the prepared items to the one or more recipients.

4. The computer system of claim 1, wherein the instructions, when executed by the one or more processors, further causes performance of:
using the particular machine learning system, computing a confidence interval of times for the estimated pickup time;
selecting a time to send a request to a particular courier of the available couriers based, at least in part, on the confidence interval of times.

5. The computer system of claim 4, wherein the instructions, when executed by the one or more processors, further causes performance of reading a current time value of a system clock, determining that the current time value is equal to the time to send the request to a particular courier, transmitting the request over a computer network to the particular courier to obtain the prepared items from the preparation entity, receiving a first completion signal from the preparation entity signaling that the particular courier obtained the prepared items, and receiving a completion signal over the computer network from the particular courier signaling that the particular courier completed transporting the prepared items to the one or more recipients.

6. The computer system of claim 1, wherein the instructions, when executed by the one or more processors, further causes performance of:
storing a plurality of machine learning systems, each of the plurality of machine learning systems corresponding to a different context of a plurality of contexts;
identifying a particular context corresponding to the request;
selecting the particular machine learning system based on the particular context.

7. The computer system of claim 6, wherein the particular context comprises a combination of a day categorization, a region categorization, and a time of day categorization.

8. The computer system of claim 6, wherein the contexts are computed from data corresponding to the request using cubic splines.

9. The computer system of claim 1, the particular machine learning system being programmed for computing the estimated pickup time using as inputs, in addition to the courier data and current request data, one or more of a historical distribution of pickup times for the preparation entity, a historical number of courier rejects for the preparation entity, a current tip amount corresponding to the request, or a current request size of the request.

10. The computer system of claim 1, wherein the instructions, when executed by the one or more processors, further causes performance of weighting each courier of the plurality of available couriers represented in the courier data by a distance to the preparation entity.

11. The computer system of claim 1, wherein the instructions, when executed by the one or more processors, further causes performance of:
using the particular machine learning system, computing a new pickup time;
determining that a difference between the new pickup time and the estimated pickup time exceeds a stored threshold value and, in response, sending a message to the preparation entity with the new pickup time.

12. A computer-implemented method comprising:
receiving, at a server computer from a requesting computing device, a request to deliver one or more prepared items associated with a preparation entity;
receiving, at the server computer, courier data identifying a plurality of available couriers within a particular geographic region in which the preparation entity is located, the couriers being capable of obtaining the prepared items from the preparation entity and transporting the prepared items to one or more recipients;
receiving, at the server computer, current request data identifying current requests to deliver prepared items from preparation entity computing devices of a plurality of entities in the particular geographic region in which the preparation entity is located;
using a particular trained machine learning system, comprising a plurality of quantile regression systems each having been trained using as inputs at least a number of available couriers at a time when an order is placed and a number of current orders at the time when the order is placed and using as outputs an amount of time from when the order was placed to when a courier arrived at a preparation entity corresponding to the order, the inputs to each of the quantile regression systems being associated with a particular context, identifying a particular context corresponding to the request; selecting the particular machine learning system based on the particular context; and computing an estimated pickup time for the one or more prepared items using, at least, the courier data and current request data as inputs into the particular machine learning system;
routing, to a computing device of the preparation entity, a request to prepare the one or more prepared items and the data identifying the estimated pickup time;
based on the courier data, current request data, and a pickup time of the request, retraining the particular trained machine learning system.

13. The computer-implemented method of claim 12, further comprising:
receiving, from the computing device corresponding to the preparation entity, an updated pickup time;
storing the updated pickup time with the request;
selecting a time to send a request to a particular courier of the available couriers based, at least in part, on the updated pickup time.

14. The computer-implemented method of claim 13, further comprising reading a current time value of a system clock, determining that the current time value is equal to the time to send the request to a particular courier, transmitting the request over a computer network to the particular courier to obtain the prepared items from the preparation entity, receiving a first completion signal from the preparation entity signaling that the particular courier obtained the prepared items, and receiving a completion signal over the computer network from the particular courier signaling that the particular courier completed transporting the prepared items to the one or more recipients.

15. The computer-implemented method of claim 12, further comprising:
using the particular machine learning system, computing a confidence interval of times for the estimated pickup time;
selecting a time to send a request to a particular courier of the available couriers based, at least in part, on the confidence interval of times.

16. The computer-implemented method of claim 15, further comprising reading a current time value of a system clock, determining that the current time value is equal to the time to send the request to a particular courier, transmitting the request over a computer network to the particular courier to obtain the prepared items from the preparation entity, receiving a first completion signal from the preparation entity signaling that the particular courier obtained the prepared items, and receiving a completion signal over the computer network from the particular courier signaling that the particular courier completed transporting the prepared items to the one or more recipients.

17. The computer-implemented method of claim 12, wherein the particular context comprises a combination of a day categorization, a region categorization, and a time of day categorization.

18. The computer-implemented method of claim 12, wherein the contexts are computed from data corresponding to the request using cubic splines.

19. The computer-implemented method of claim 12, the particular machine learning system being programmed for computing the estimated pickup time using as inputs, in addition to the courier data and current request data, one or more of a historical distribution of pickup times for the preparation entity, a historical number of courier rejects for the preparation entity, a current tip amount corresponding to the request, or a current request size of the request.

20. The computer-implemented method of claim 12, further comprising weighting each courier of the plurality of available couriers represented in the courier data by a distance to the preparation entity.

21. The computer-implemented method of claim 12, further comprising:
using the particular machine learning system, computing a new pickup time;
determining that a difference between the new pickup time and the estimated pickup time exceeds a stored threshold value and, in response, sending a message to the preparation entity with the new pickup time.

* * * * *